(12) United States Patent
Schubert

(10) Patent No.: US 8,188,717 B2
(45) Date of Patent: May 29, 2012

(54) ACTIVE COMMUNICATIONS BUS POWER HARVESTER FOR DIFFERENTIAL SIGNAL COMMUNICATION SYSTEM

(75) Inventor: Clifford Schubert, Sidney (CA)

(73) Assignee: Schneider Electric USA, Inc., Palatine, IL (US)

( * ) Notice: Subject to any disclaimer, the term of this patent is extended or adjusted under 35 U.S.C. 154(b) by 340 days.

(21) Appl. No.: 12/648,937

(22) Filed: Dec. 29, 2009

(65) Prior Publication Data
US 2011/0156658 A1 Jun. 30, 2011

(51) Int. Cl.
*H02J 7/00* (2006.01)
(52) U.S. Cl. .......................................... 320/137
(58) Field of Classification Search ............... 320/162, 320/137
See application file for complete search history.

(56) References Cited

U.S. PATENT DOCUMENTS

| | | | |
|---|---|---|---|
| 6,363,066 B1 | 3/2002 | Frimodig | |
| 7,034,503 B2 * | 4/2006 | Veselic et al. | 320/128 |
| 7,391,299 B2 | 6/2008 | Bender et al. | |
| 7,576,635 B2 | 8/2009 | Bender et al. | |
| 7,612,654 B2 | 11/2009 | Bender et al. | |
| 2007/0168596 A1 | 7/2007 | Hall et al. | |
| 2009/0322271 A1* | 12/2009 | Zimmermann | 318/440 |

FOREIGN PATENT DOCUMENTS
WO WO 2008-011894 A1 1/2008

OTHER PUBLICATIONS

KK Systems, Ltd., K2 RS232-RS422/485 Converter, K2-ADE RS232-RS485 Converter with ADE, 2002 KK Systems, Ltd., Ed. 2, Jan. 11, 2002 (6 pages).
Allen-Bradley, User Manual Smart Self-Powered Serial Converter (Cat. No. 1203-SSS) Series B FRN2.xxx, Rockwell Automation, Publication 1203-5.15—Aug. 1999 PN 193416(01) (44 pages).
International Search Report for International Application No. PCT/US2010/059099, dated Jul. 20, 2011 (4 pages).
Written Opinion of The International Searching Authority for International Application No. PCT/US2010/059099, dated Jul. 20, 2011 (6 pages).

* cited by examiner

*Primary Examiner* — Ramy Ramadan
(74) *Attorney, Agent, or Firm* — Nixon Peabody LLP

(57) ABSTRACT

A balanced differential signal communication system having at least two data lines connecting multiple nodes in series, each node comprising a signal generator for applying signals to the data lines that produce a controllable differential voltage across the data lines; a rechargeable storage device for receiving electrical energy from the data lines to charge the storage device; at least one device coupled to the storage device for receiving electrical energy from the storage device; and a controllable converter coupling the data lines to the storage device for controlling the charging and discharging of the storage device with power captured from the data lines.

16 Claims, 4 Drawing Sheets

ACTIVE COMMUNICATIONS BUS POWER HARVESTER FOR DIFFERENTIAL SIGNAL COMMUNICATION SYSTEM

FIELD OF THE INVENTION

The present invention relates generally to supplying power to devices coupled to a differential signal communication system by harvesting electrical power from data lines of the communication system.

BACKGROUND

Differential signal communication systems are in widespread use. For example, RS-485 is a well known serial digital communication system that uses balanced differential signals for communicating with computers and other devices. RS-485 allows multiple devices to communicate at half-duplex on a single pair of wires, plus a ground wire, over long distances. Both the length of the network and the number of nodes can easily be extended using a variety of different repeater products that are readily available. The properties of differential signals provide high noise immunity and long distance capabilities.

RS-485 is the most versatile communication standard in the standard series defined by the EIA, as it performs well for connecting data terminal equipment (DTE) directly without the need of modems, for connecting several DTE's in a network structure, for communicating over long distances, and for communicating at fast communication rates. RS-485 is currently a widely used communication interface in data acquisition and control applications where multiple nodes communicate with each other. RS-485 signals are floating with each signal being transmitted over a S+ line and a S− line. The RS-485 receiver compares the voltage difference between the two lines, rather than the absolute voltage level on a single line.

RS-485 interfaces are often preferred for data acquisition and control applications because RS-485 is capable of internetworking multiple transmitters and receivers in the same network. High-resistance RS-485 inputs allow a large number of nodes to be used, and RS-485 repeaters can be used to increase the number of nodes even more.

BRIEF SUMMARY

The present disclosure provides a balanced differential signal communication system having at least two data lines connecting multiple nodes in series, each node comprising a signal generator for applying signals to the data lines that produce a controllable differential voltage across the data lines; a rechargeable storage device for receiving electrical energy from the data lines to charge the storage device; at least one device coupled to the storage device for receiving electrical energy from the storage device; and a controllable converter coupling the data lines to the storage device for controlling the charging of the storage device with power captured from the data lines.

One implementation includes a microcontroller coupled to the controllable converter and producing a control signal that affects the amount of power captured from the data lines by the converter; a multiplexer coupled between the microcontroller and the converter and having a pair of input terminals for receiving a pair of input signals, an output terminal, and a control input for receiving a control signal from the microcontroller for selecting which input signals are included in the output signal produced at the output terminal, one of the inputs receiving the control signal produced by the microcontroller; and a source of a fixed reference voltage coupled to the other of the inputs to the multiplexer. The microcontroller may be programmed to send messages via the data lines to other nodes coupled to the data lines to cause the other nodes to respond to the messages via the data lines, and the converter captures power from the responses for recharging the storage device.

One embodiment includes a sensor coupled to the data lines for sensing the voltage differential between the data lines and supplying a signal representing the voltage differential to the microcontroller, and a microcontroller is programmed to use the signal representing the voltage differential to determine a load that can be imposed on the data lines without interfering with communications on the data lines. The converter is preferably controllable to vary the load that the converter imposes on the data lines, so that the load does not interface with communicating via the data lines.

BRIEF DESCRIPTION OF THE DRAWINGS

The invention may best be understood by reference to the following description taken in conjunction with the accompanying drawings, in which.

DETAILED DESCRIPTION

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
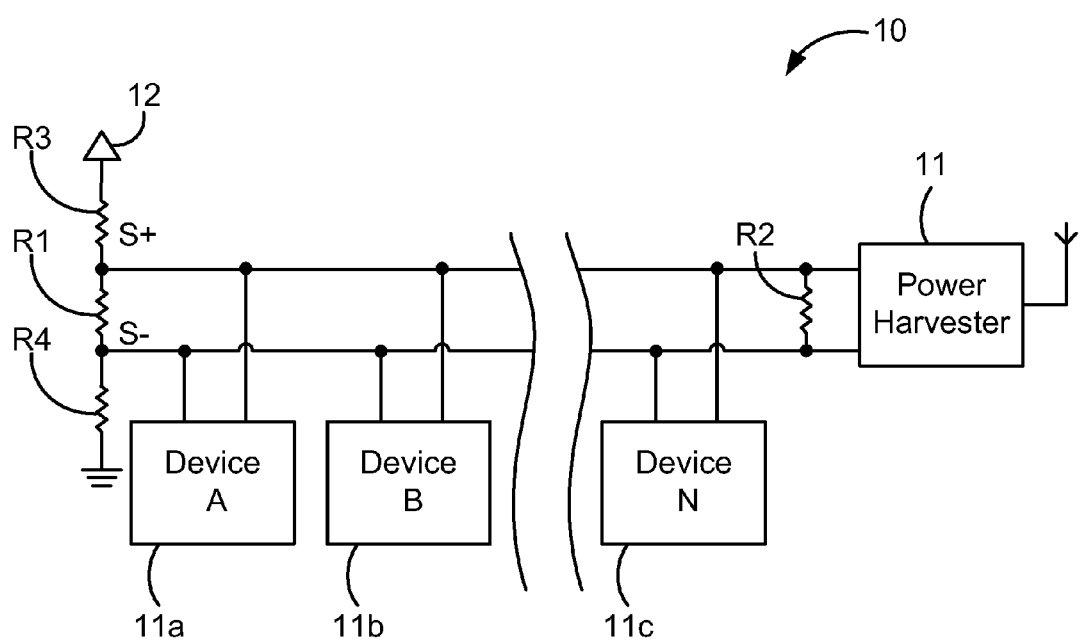
FIG. 1 is a block diagram of an RS-485 communication system that includes multiple nodes and a power harvesting device for harvesting electrical power from the data lines of the bus.

Turning to the drawings, FIG. 1 is a functional block diagram of an RS-485 communication system that includes a differential bus 10 is formed by a pair of data lines S+ and S−, and multiple nodes formed by devices 11a, 11b . . . 11n coupled to the bus 10 at different points along the length of the bus. An RS-485 communication channel can be shared by multiple receivers and multiple senders. In the illustrative embodiment, the bus 10 is terminated by resistances R1 and R2 at opposite ends, and a bias voltage is supplied to one end of the bus from a source 12 through voltage divider formed by a pair of resistors R3 and R4 in combination with the terminating resistor R1. For high bit rates and long wiring runs, termination resistances are necessary on both ends of the bus 10 to eliminate reflections, but not at drop points along the bus. High bit rates are possible because the transition between logical 0 and logical 1 is only a few hundred millivolts, and currently available RS-485 drivers can achieve bit rates of at least 35 mbps.

Although FIG. 1 illustrates an RS-485 two-wire multi-drop bus, it will be understood that an RS-485 network can also be connected in a four-wire mode, using four data wires and an additional signal ground wire. In a four-wire network, one node is a master node and all others are slave nodes. The network is connected so that the master node communicates to all slave nodes, and all slave nodes communicate only with the master node. Since the slave nodes never listen to another slave response to the master, a slave node cannot reply incorrectly to another slave node. RS-422 systems are also use balanced differential signals, using a dedicated pair of wires for each signal, a transmit pair, a receive pair and an additional pair for each handshake/control signal used (if required). In a "two-wire" network the transmitter and receiver of each device are connected to a twisted pair. "Four-wire" networks have one master port with the transmitter connected to each of the "slave" receivers on one twisted pair. The "slave" transmitters are all connected to the "master" receiver on a second twisted pair. In either configuration, devices are addressable, allowing independent communications with each node.

Figure 2:
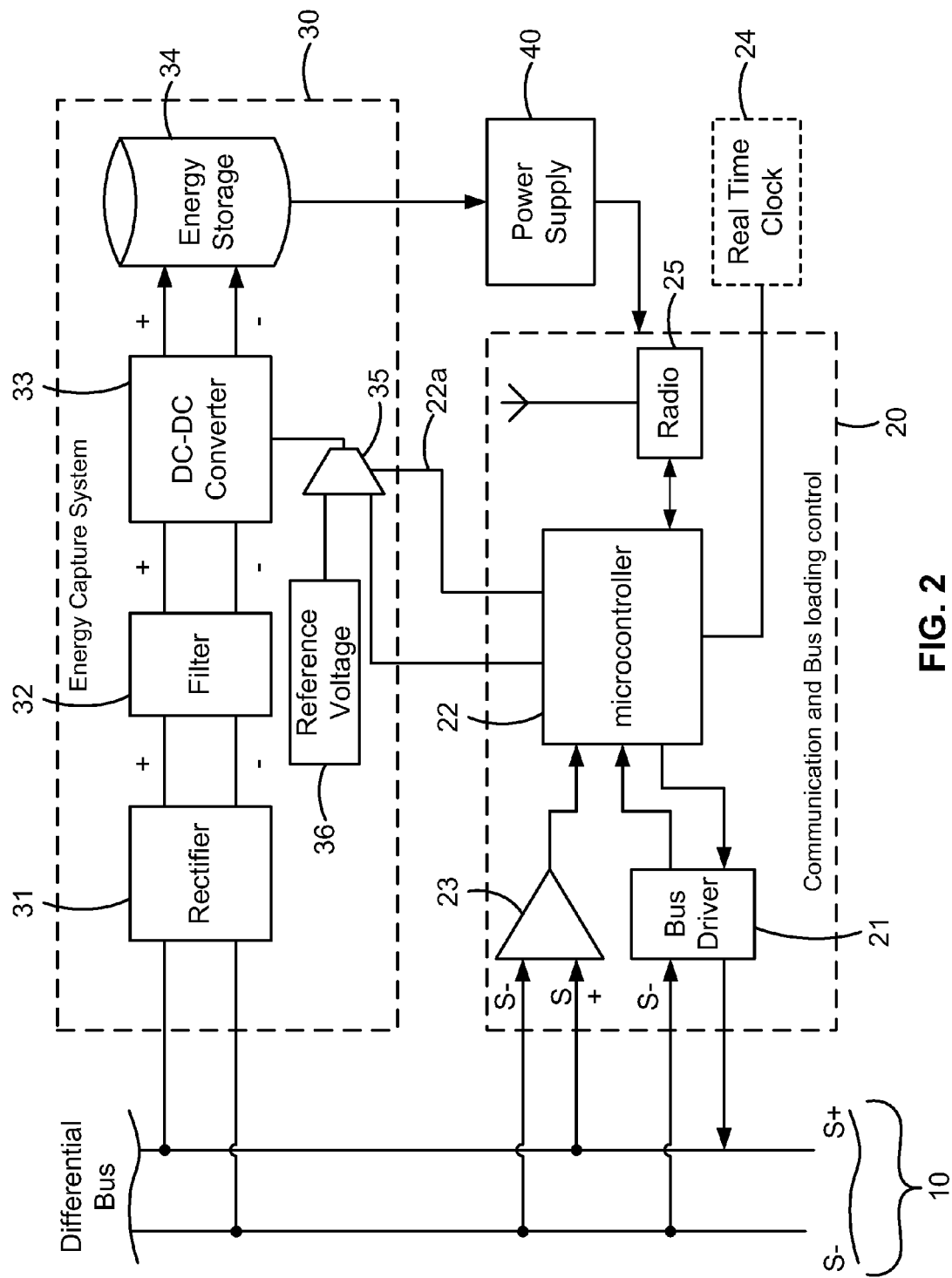
FIG. 2 is a block diagram of one of the nodes in the system of FIG. 1.

FIG. 2 is a more detailed illustration of one of the node devices 11, which includes a communication and bus loading control 20 and an energy capture system 30, both of which are coupled to the two data lines S+ and S− of the bus 10. As is well known, the data lines S+ and S− are preferably in the form of a twisted pair, to provide noise immunity. The energy capture system 12 supplies electrical power to a power supply 40 that powers the communication and bus loading control 11.

Within the communication and bus loading control 20, an RS-485 bus driver 21 sends signals to, and receives signals from, the data lines S+ and S− of the bus 10. The driver 21 delivers received signals to a microcontroller 22, and receives signals from the microcontroller 22 for delivery to the bus 10. Only one device can drive the data lines at a time, so the drivers at the various nodes must be put into a high-impedance mode (tri-state) when they are not in use. An RS-485 driver is typically enabled and disabled by an RTS control signal from an asynchronous serial port. Setting the RTS line to a high (logic 1) state enables the driver, while setting the RTS line to a low (logic 0) state puts the driver into a tristate condition that in effect disconnects the driver from the bus, allowing other nodes to transmit over the same pair of data lines. The RS-485 driver typically returns to its high impedance tri-state within a few microseconds after data has been sent, so it is not necessary to have delays between data packets on the RS-485 bus. These tristate capabilities of RS-485 nodes allow a single pair of wires to share transmit and receive signals for half-duplex communications.

The microcontroller 22 also receives the output of an operational amplifier 23 that has two inputs coupled to the two data lines S+ and S−, so that the output of the amplifier 23 represents the difference between the voltage levels on the two data lines S+ and S−. The microcontroller 22 also receives inputs from a real time clock 24 and a radio transceiver 25, and delivers control signals to the energy capture system 30, as will be discussed in more detail below. The transceiver 25 is typically a generic low power radio transceiver, such as a ZigBee radio, or the transceiver may be replaced with a signal/protocol converter.

The energy capture system 30 includes a rectifier 31 having a pair of inputs coupled to the two data lines S+ and S−, producing a rectified output that is smoothed by a filter 32 and then supplied as the DC input to a controllable DC-to-DC converter 33. The DC output of the converter 33 is supplied to an energy storage device 34, such as a rechargeable battery or an ultra capacitor. The output of the storage device 34 is connected to the power supply 40 that supplies power to the communication and bus loading control 20, including the microcontroller 22 and the radio 25. When the storage device is a rechargeable battery, it may be installed pre-charged to reduce the initial charge and discovery time, or it may be initially charged by some other means such as a USB plug-in to a computer.

To control the charging of the energy storage device 34, the microcontroller produces control signals for a multiplexer 35 that also receives a reference voltage form a reference voltage source 36. The multiplexer 35 selects one of its two inputs, from the microcontroller 22 and the reference voltage source 36, for application to the converter 33. The selection is controlled by a "select" signal generated on output line 22a from the microcontroller 22 and applied to the select input of the multiplexer 35, which determines which of the two multiplexer inputs is supplied to the converter 33. It will be understood that either a digital or analog multiplexer may be used, depending on the type of control desired for the converter 33. This control of the converter 33 enables the system 30 to capture small amounts of energy from the biasing voltage on the bus 10, or to capture larger amounts of energy from data signals on the bus when the data lines S+ and S− are driven by other devices on the bus. By controlling the converter, the system is able to vary the load it puts on the bus 10 to capture more or less power, while ensuring that the load does not interfere with communications. The converter may be controlled to change not only the power captured from the bus 10, but also the impedance it presents to the bus to improve communication and/or the power harvesting capabilities.

Upon connection to the bus 10, the converter 33 and the storage device 34 capture a small amount of power from the biasing circuit for the bus 10. The converter 33 varies its load to draw as much power as possible from the bus biasing circuit without exceeding the specification of the communications system or dropping the biasing voltage below the appropriate threshold for the applicable communications standard. Any communications that occur on the bus 10 allow the converter 33 to charge the storage device 34 faster than just the biasing voltage, and those communications can also be used to identify the type of network or protocol being used, as described in more detail below.

After the storage device 34 has accumulated enough energy to enable the microcontroller 22 and the driver 21 to generate a request, they transmit a harmless request to the other nodes on the bus 10, such as a Modbus read or identify request. The microcontroller may identify the desired type of communication automatically by monitoring traffic on the bus 10, or the microcontroller may have been pre-configured for a certain setting. If there is no response to a request generated by the microcontroller 22 and the driver 21, the converter 33 continues charging the storage device 34 from the bias voltage while the microcontroller 22 continues to generate different types of messages or targets different nodes until a response is received.

After a response is received, the power-harvesting system has a better source of power and can begin issuing additional requests to detect other protocols or devices on the network. For example, certain nodes on the bus 10 may have stronger drivers, which can be detected by varying the load on the network while listening for a response, or certain nodes may respond faster or support other commands that produce longer responses and therefore supply more power for each request. The microcontroller may be programmed to look for the option that will provide the most power for charging the storage device 34, both in terms of the device's driving capabilities and the ratio of power received to power required to transmit.

In the illustrative example with the radio 25, the microcontroller 22 can turn on the radio 25 and thus begin wireless communications after a stable source of energy has been obtained and sufficient energy has been stored. Other nodes on the bus 10 can be polled as needed to maintain the required power.

When the illustrative device is acting as a bridge or converter between a radio network and a wired communications bus, incoming requests can be buffered while power is being harvested from the wired bus. Then a message can be transmitted from the wireless network, and any response will be forwarded back onto the radio network. The radio 25 or the entire device may be designed to go into a low power "sleep" state and only power up when traffic is received from the wired communications bus, or in response to a periodic radio timer.

Figure 3:
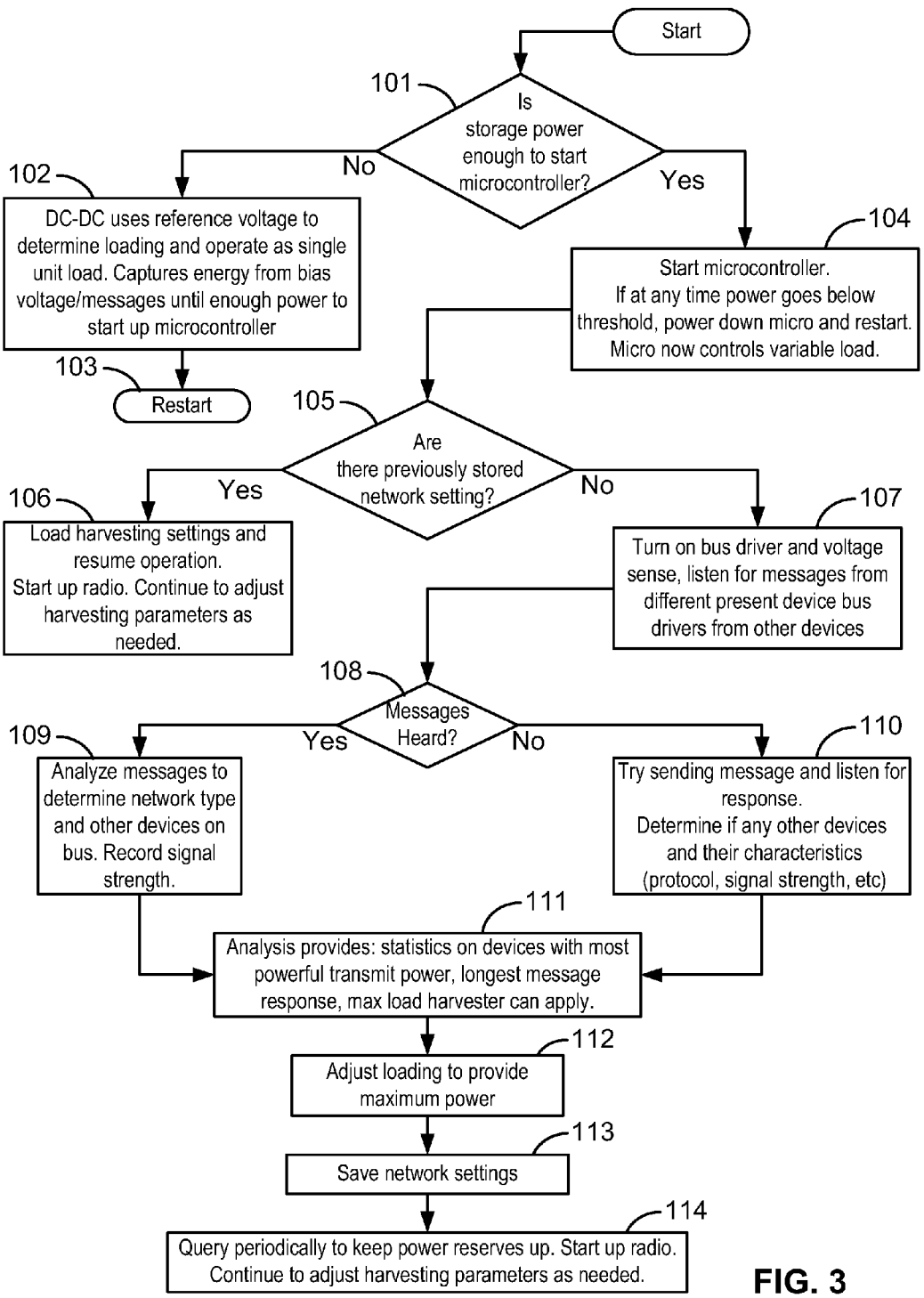
FIG. 3 is a flow chart of a program executed by the microcontroller in the node of FIG. 2 to control the harvesting of electrical power from the bus.

FIG. 3 is a flow chart of a power-up sequence for the power harvester illustrated in FIG. 2. Step 101 determines whether the energy storage device 34 has accumulated enough power to start the microcontroller 22, and if the answer is negative, step 102 indicates that the DC-to-DC converter 33 uses the fixed reference voltage from source 36 to determine the loading on the bus 10. That is, the converter 33 operates as a single unit load, capturing energy from the bias voltage and any messages on the data lines S+ and S− until enough power is accumulated in the storage device 34 to start up the microcontroller 22.

When the response at step 101 is affirmative, the microcontroller 22 is started at step 104 so that the balance of the steps in FIG. 3 can be executed by the microcontroller. If at any time the power available from the storage device 34 drops below a preselected threshold, the microcontroller 22 is powered down and re-started when the accumulated power again rises above that threshold. After the microcontroller 22 has been started, the microcontroller 22 controls the variable load imposed on the bus 10 by the DC-to-DC converter 33, via the control signal applied to the select input of the multiplexer 35 by the microcontroller.

From step 104, the system advances to step 105, which determines whether there are any previously stored network settings. If step 105 yields an affirmative answer, the system proceeds to step 106 to load any settings for the power harvester settings and resume operation, including turning on the radio 25. The system then advances to step 114, which queries the network settings periodically and adjusts the power-harvesting parameters as needed to maintain a maximum power reserve.

When step 105 yields a negative response, indicating that there are no previously stored network settings, the system advances to step 107 to turn on the bus driver 21, to turn on the voltage differential-sensing amplifier 23, and to listen for messages. The system then advances to step 108 to listen for messages. When a message is detected, step 108 produces an affirmative response, which advances the system to step 109 which analyzes the message to collect data from the message, such as network type, other devices on the bus and signal strength. The collected data is then analyzed at step 111 to determine desired statistics such as the identity of devices having the most transmit power, the longest message response, the maximum load the harvester can apply to the bus 10 without adversely affecting communications, etc.

When no message is detected, step 108 yields a negative response, the system advances to step 110 to transmit a message via the bus driver 21 and then listen for a response. Any response is used to collect the same type of data collected at step 109, namely, network type, other devices on the bus signal strength, etc. The collected data is then analyzed at step 111 to determine desired statistics such as the identity of devices having the most transmit power, the longest message response, the maximum load the harvester can apply to the bus 10 without adversely affecting communications, etc.

From step 11, the system advances to step 112 to adjust the loading on the bus 10 to provide maximum power to recharge the storage device 34, and then those network settings are saved at step 113. Then step 114 queries the network settings periodically and adjusts the power-harvesting parameters as needed to maintain a maximum power reserve. It will be understood that the loading on the bus is adjusted by the DC-to-DC converter 33 in response to the output signal received by the converter from the multiplexer 35, which in turn is controlled by the control signal applied to the select input of the multiplexer 35 by the microcontroller 22.

Figure 4:
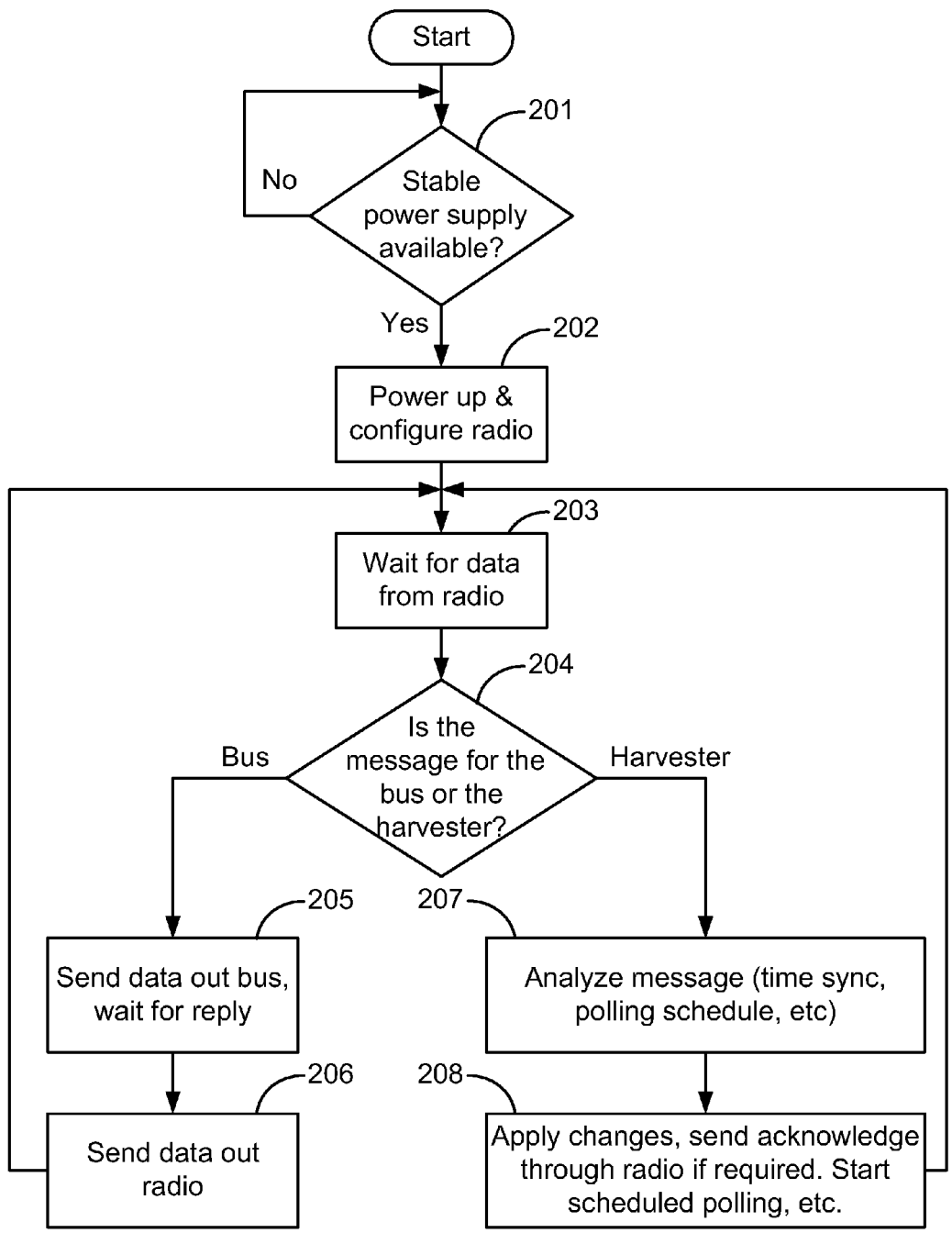
FIG. 4 is a flow chart of a program executed by the microcontroller in the node of FIG. 2 to control radio/bus messaging.

FIG. 4 is a flow chart of a routine executed by the microcontroller 22 to control messaging operations via the radio 25 and the bus 10. The radio 25, which can wait to be triggered by another device or can query a central device on power up, serves to synchronize multiple power harvesters and to relay messages between the bus 10 and another location, either on request or as part of a scheduled operation.

The routine in FIG. 4 begins at step 201, which determines whether a stable power supply is available, based on stored data relating to power supplied to the microcontroller from the power supply 40 over a selected time interval. This step repeats until it produces an affirmative response, which advances the system to step 202 to power up and configure the radio 25. Step 203 then waits for data from the radio 25, and advances to step 204 when such data is received. Step 204 determines whether the radio message is for the bus 10 or the power harvester. If the message is for the bus, the data is sent out on the bus 10 at step 205, after being reformatted by the microcontroller 22 if necessary, and is then sent out on the radio 25 at step 206. If step 204 determines that the radio message is for the power harvester, the routine advances to step 207 to analyze the message for information such as time synchronization, polling schedule, etc. Step 208 then applies any changes, sends an acknowledgment through the radio if required, starts scheduling polling, etc.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A balanced differential signal communication system having at least two data lines connecting multiple nodes in series, each node comprising a signal generator for applying signals to said data lines that produce a controllable differential voltage across said data lines, a receiver coupled to said data lines for detecting said differential voltage, a rechargeable storage device coupled to said data lines for receiving electrical energy from said data lines to charge said storage device, at least one device coupled to said storage device for receiving electrical energy from said storage device, and a controllable converter coupling said data lines to said storage device for controlling the charging of said storage device with power captured from said data lines, wherein said signal generator generates signals for transmission to other nodes coupled to said data lines to stimulate said other nodes to generate signals for transmission via said data lines, to provide additional power to be captured by said converter from said data lines.

2. The balanced differential signal communication system node of claim 1 which includes a microcontroller coupled to said controllable converter and producing a control signal that affects the amount of power captured from said data lines by said converter.

3. The balanced differential signal communication system of claim 1 in which said controllable converter imposes a DC-to-DC load on said data lines at a default level, and which includes control circuitry for overriding said default-level load to increase the DC-to-DC load on said data lines to increase the rate of charging said storage device.

4. The balanced differential signal communication system node of claim 1 which includes a bias voltage source coupled to said data lines for applying a bias voltage across said data lines.

5. The balanced differential signal communication system node of claim 1 which includes a voltage source and bias resistors connected across said data lines to maintain a minimum bias current flow in said data lines for noise suppression.

6. The balanced differential signal communication system node of claim 1 in which said controllable differential voltage has two different levels, representing the two states of a binary signal transmitted via said communication line.

7. The balanced differential signal communication system node of claim 1 in which said rechargeable storage device is a rechargeable battery or a capacitor.

8. The balanced differential signal communication system node of claim 2 in which said microcontroller is programmed to send messages via said data lines to other nodes coupled to said data lines to cause said other nodes to respond to said messages via said data lines, said converter capturing power from said responses for recharging said storage device.

9. The balanced differential signal communication system node of claim 1 in which said converter is controllable to vary the load that said converter imposes on said data lines, so that said load does not interface with communicating via said data lines.

10. The balanced differential signal communication system node of claim 2 which includes a sensor coupled to said data lines for sensing the voltage differential between said data lines and supplying a signal representing said voltage differential to said microcontroller, and said microcontroller is programmed to use said signal representing said voltage differential to determine a load that can be imposed on said data lines without interfering with communications on said data lines.

11. The balanced differential signal communication system node of claim 1 in which said load imposed by said controllable converter on said data lines is an adjustable resistive or reactive load.

12. The balanced differential signal communication system node of claim 2 which includes
a multiplexer coupled between said microcontroller and said converter and having a pair of input terminals for receiving a pair of input signals, an output terminal, and a control input for receiving a control signal from said microcontroller for selecting which input signals are included in the output signal produced at said output terminal, one of said inputs receiving said control signal produced by said microcontroller, and
a source of a fixed reference voltage coupled to the other of said inputs to said multiplexer.

13. A method of harvesting electrical power from a balanced differential signal communication system having at least two data lines connecting multiple nodes that include a signal generator for applying signals to said data lines to produce a controllable differential voltage across said data lines, and a receiver coupled to said data lines for detecting said differential voltage, said method comprising coupling a rechargeable storage device to said data lines through a controllable converter that charges said storage device with electrical energy captured from said data lines, coupling at least one device to said storage device for receiving electrical energy from said storage device, and generating signals for transmission to other nodes coupled to said data lines to stimulate said other nodes to generate signals for transmission via said data lines, to provide additional power to be captured by said converter from said data lines.

14. The method of claim 13 which includes rectifying non-DC energy removed from said data lines, said controllable converter imposes a DC-to-DC load on said data lines, and controlling said DC-to-DC load to adjust the rate of charging said storage device without interfering with communications on said data lines.

15. The method of claim 14 in which said DC-to-DC load is imposed on said data lines at a default level, and which includes overriding said default-level load to increase the DC-to-DC load on said data lines to increase the rate of charging said storage device.

16. The method of claim 13 which includes sending messages via said data lines to other nodes coupled to said data lines to cause said other nodes to respond to said messages via said data lines, said converter capturing power from said responses for recharging said storage device.

* * * * *